US012692918B2

(12) United States Patent
Gherardi et al.

(10) Patent No.: US 12,692,918 B2
(45) Date of Patent: Jul. 28, 2026

(54) BRAKING BAND OF A DISC BRAKE DISC

(71) Applicant: BREMBO S.p.A., Curno (IT)

(72) Inventors: Pierangelo Gherardi, Curno (IT);
Daniele Penati, Curno (IT); **Raffaello
Passoni, Curno (IT); Simone Turani**,
Curno (IT); Matteo Bottin, Curno (IT);
Marco Caronia, Curno (IT)

(73) Assignee: Brembo S.p.A., Curno (IT)

( * ) Notice: Subject to any disclaimer, the term of this
patent is extended or adjusted under 35
U.S.C. 154(b) by 389 days.

(21) Appl. No.: 18/267,471

(22) PCT Filed: Dec. 10, 2021

(86) PCT No.: PCT/IB2021/061544
§ 371 (c)(1),
(2) Date: Jun. 15, 2023

(87) PCT Pub. No.: WO2022/130142
PCT Pub. Date: Jun. 23, 2022

(65) Prior Publication Data
US 2024/0093740 A1     Mar. 21, 2024

(30) Foreign Application Priority Data
Dec. 15, 2020    (IT) ........................ 102020000030893

(51) Int. Cl.
*F16D 65/12*          (2006.01)
*F16D 65/095*         (2006.01)
(Continued)

(52) U.S. Cl.
CPC ......... *F16D 65/123* (2013.01); *F16D 65/095*
(2013.01); *F16D 65/128* (2013.01); *F16D
65/847* (2013.01); *F16D 2065/1332* (2013.01)

(58) Field of Classification Search
CPC ......... F16D 65/095; F16D 65/123–128; F16D
65/847
(Continued)

(56) References Cited

U.S. PATENT DOCUMENTS

| | | | | |
|---|---|---|---|---|
| 5,950,772 A * | 9/1999 | Buckley | .................. | B62L 3/023 |
| | | | | 188/26 |
| RE36,363 E | 11/1999 | Tilton et al. | | |
| 6,206,151 B1 * | 3/2001 | Nakamura | .............. | B62L 3/023 |
| | | | | 188/73.1 |
| 9,400,018 B2 | 7/2016 | Kremer et al. | | |

(Continued)

FOREIGN PATENT DOCUMENTS

| | | |
|---|---|---|
| CN | 103758902 A | 4/2014 |
| DE | 102018130489 A1 | 6/2020 |

(Continued)

OTHER PUBLICATIONS

European Patent Office, International Search Report, issued in
PCT/IB2021/061544, Feb. 23, 2022, Rijswijk, NL.

*Primary Examiner* — Christopher P Schwartz
(74) *Attorney, Agent, or Firm* — Marshall & Melhorn,
LLC

(57) ABSTRACT

A braking device has a portion having a braking surface
adapted to come into contact with an opposite facing braking
surface to apply a braking action, the braking surface being
circumferentially free from obstacles to allow relative rota-
tion between the braking surface and opposite facing brak-
ing surface when mutually in contact, and defining, in any
point with respect to a revolution axis if the braking surface
is fixed, or a rotation axis if the braking surface is rotative,
an axial direction, a radial direction, a circumferential direc-
tion, and a tangential direction. A support connecting portion
is radially outside the braking surface, either radially away
from or outside the braking surface or either radially close
to or inside the braking surface. A cooling portion, included
circumferentially and laterally to the support connecting (Continued)

portion, has a plurality of axially through-openings adapted to increase a heat exchange surface and unadapted to create connecting surfaces.

16 Claims, 10 Drawing Sheets

(51) Int. Cl.
     *F16D 65/847*        (2006.01)
     *F16D 65/02*         (2006.01)

(58) Field of Classification Search
     USPC ... 188/218 XL, 250 B, 250 G, 264 R, 264 A
     See application file for complete search history.

(56)             References Cited

U.S. PATENT DOCUMENTS

| | | | |
|---|---|---|---|
| 2006/0266600 | A1 | 11/2006 | Demers |
| 2013/0168193 | A1 | 7/2013 | Iwai et al. |
| 2019/0101174 | A1* | 4/2019 | Huang .................. F16D 65/123 |
| 2020/0407009 | A1* | 12/2020 | Dunlap, III ........... F16D 65/128 |

FOREIGN PATENT DOCUMENTS

| | | | |
|---|---|---|---|
| EP | 593715 | B1 | 5/1996 |
| EP | 867634 | A2 | 9/1998 |
| EP | 1046575 | A2 | 10/2000 |
| JP | 2016038029 | A | 3/2016 |
| JP | 6548290 | B2 | 7/2019 |
| WO | 2014132202 | A1 | 9/2014 |

* cited by examiner

BRAKING BAND OF A DISC BRAKE DISC

FIELD OF THE INVENTION

The present invention relates to a braking band and a disc brake disc, particularly, but not exclusively, for racing applications.

BACKGROUND ART

In a disc brake, the brake caliper is generally arranged straddling the outer peripheral margin of a brake disc, adapted to rotate about a rotation axis (X-X) defining an axial direction (A-A). In a brake disc, there are defined a radial direction (R-R) substantially orthogonal to said axial direction (A-A), and a circumferential direction (C-C) orthogonal to both said axial direction (A-A) and said radial direction (R-R), and a tangential direction (T-T) locally, or rather punctually, i.e., in an intersection point of an axial and radial direction, orthogonal to both said axial direction (A-A) and said a radial direction (R-R).

As known, disc brake discs comprise a bell adapted to associate the disc with a hub of a vehicle, from which an annular portion, referred to as a braking band, extends, which is intended to cooperate with brake pads of a caliper. In the case of discs of ventilated type, the braking band is obtained by means of two facing plates connected to each other by means of connecting elements, e.g., in the form of pins or fins. The outer surfaces of the two plates define opposite braking surfaces, while the inner surfaces, together with the pins or fins, delimit ventilation channels for cooling the disc, which channels are crossed by airflows according to a centrifugal direction during the rotary motion of the disc itself.

In the case of racing applications, the disc brake discs are often connected directly to the wheel hub, in automotive applications, or to the wheel rim, in the case of motorcycle applications. In the case of ventilated discs, the braking band centrally has radial perforations which create ventilation channels running from the inner edge to the outer edge of the disc. Ventilated discs of the type mentioned above have undergone a continuous evolution over time, in particular as for the number and shape of the so-called ventilation channels.

Said braking band is intended to cooperate with disc brake calipers adapted to apply a braking action to the vehicle by applying, by means of pads, friction to the opposite surfaces of the two plates, referred to as braking surfaces.

It is known that, during the operation of the brakes, the friction between the pads of the brake calipers and the braking surfaces of the braking band generates a high amount of heat which requires disposal.

The heat generated indeed causes several undesired phenomena, such as, for example, the deformation of the braking band, the formation of cracks on the braking surfaces, or localized state transformations of the material forming the braking band, which in turn result in the deterioration of the braking band itself.

In applications on high-performance motorcars with great braking efficiency, in particular, there is much energy to be disposed of, and the aforesaid need to dispose of the heat generated during the braking action is even more felt.

In motorcycle racing applications, the continuous increase in vehicle performance is also adding demand for ever-higher performance of the braking system as well. This necessarily affects the disc temperature, whether it is made of carbon (e.g., for MotoGP applications) or steel (e.g., for SBK applications).

Brake discs have now reached diameters and thicknesses which are difficult to increase for reasons of space availability in the vehicle.

Additionally, the vehicle manufacturers or users (the racing teams) implement aerodynamic solutions to be able to discharge more and more torque on the front wheel during braking, thus delaying the rollover of the motorcycle.

Furthermore, the racing teams are paying more and more attention to dedicated ventilation contrivances in order to decrease the braking system temperatures, which also limit the maximum size of the braking system.

The unquestionable increase in temperatures of the brake discs, and therefore of the entire braking system, affects the consistency of performance and the rider's feel of the braking system.

Additionally, the disc layout for motorcycle applications does not allow the use of conventional ventilated disc geometries, as on cars, because the maximum usable thicknesses are currently only a few millimeters (typically 8 to 10 mm).

For example, the carbon disc currently in use for MotoGP has a solid band. The front surface lends itself very well to being ventilated by air forced through ventilation ducts for the purpose.

Therefore, the need arises for new disc structures which, with the same maximum size or footprint, allow increasing the heat exchange surface and preferably with shapes which facilitate this heat exchange, and thus the turbulence of the cooling fluid around the braking system.

Disc or pad solutions having legs are known. For example, brake or clutch disc solutions using legs to create a geometric connection between the disc and the support thereof are known from documents DE102018130489A1, EP867634, USRE36363, EP593715, U.S. Pat. Nos. 9,400, 018, 9,400,018, JP6548290. Therefore, in these known solutions, the legs, despite creating an increase in the surface area, cover these surfaces with the coupling to supporting elements, thus making these surfaces entirely unsuitable for creating a heat exchange with a cooling fluid which, in these cases, cannot circulate in contact with or even around these surfaces.

Brake disc solutions having legs or holes dedicated to position or speed detecting devices, such as phonic wheels, are also known. For example, a solution of this type is known from WO2014132202A1. Obviously, these known solutions should be entirely dedicated to sensors which, placed close to these surfaces, make them unsuitable for heat exchange. Furthermore, being dedicated to sensor coupling, these surfaces oblige to increase the overall size of the device, e.g., of the brake disc, as it is entirely impossible to place them circumferentially by the side of other functions, e.g., such as devices for the connection with disc supporting members.

On the other hand, the known solutions shown in US2006266600A1 are entirely unsuitable because they alter the size of the brake pads, especially in the axial direction.

Therefore, the need to suggest geometries of the braking devices, such as the braking band and the brake pads, which promote the heat exchange, but which at the same time do not alter the overall size of the braking system, remains strongly felt.

Therefore, the problem underlying the present invention is to devise a braking device, such as the braking band and the brake pad, which have structural and functional features such as to meet the aforesaid needs while solving the drawbacks mentioned with reference to the prior art and meeting the needs felt above.

In particular, it is an object to suggest solutions which allow lowering the temperature of the braking devices, such as the braking band and the brake pad, for racing sports applications, in particular but not necessarily if made of carbon or steel, thus impacting on their weight and overall size as little as possible.

It is a further object to offer the possibility to racing teams to make the most of the air already conveyed to the brake disc and brake pad zone, thus greatly increasing the HTC of that zone and allowing much more efficient disc and pad heat exchanges.

Solution

It is the object of the present invention to provide a braking device in which the heat exchange capacity is increased.

These and other objects and advantages are achieved by a braking device as described and claimed herein.

Some advantageous embodiments are also described.

From the discussion of this solution, it follows that the suggested solution allows achieving an increase of 20-22% of the heat exchange surface with the same overall size, e.g. the outer diameter of the brake disc, thus allowing a lower temperature of the brake disc and the brake pad with the same conditions of use, without increasing the weights.

The following results were obtained with the solutions suggested in the present invention in tests conducted by comparing the current solutions with the solutions suggested by the invention, under equal test cycle conditions (replicating the braking conditions of a racing circuit):

- a reduction in the overall weight of the braking system;
- a reduction in the start-of-braking temperature;
- a reduction in the maximum temperature during braking;
- a reduction in the average temperature;
- a consequent decrease in temperature of the pads but also of the brake caliper;
- lesser heat transferred to the caliper and the brake fluid, thus preserving the gaskets and eliminating the danger of creating gas bubbles in the brake fluid;
- a better behavioral consistency of the brake lever perceived by the rider.

Furthermore, the suggested solutions are of simpler mechanical construction compared to the car disc ventilations obtained with ventilation channels placed between two plates and connected by complex geometries of pegs or fins placed inside to the ventilation duct to connect the two plates.

DRAWINGS

Further features and advantages of the device will become apparent from the description provided below of preferred embodiments thereof, given for illustrative but not limiting purposes, with reference to the accompanying drawings, in which.

DESCRIPTION OF SOME PREFERRED EMBODIMENTS

Figure 1:
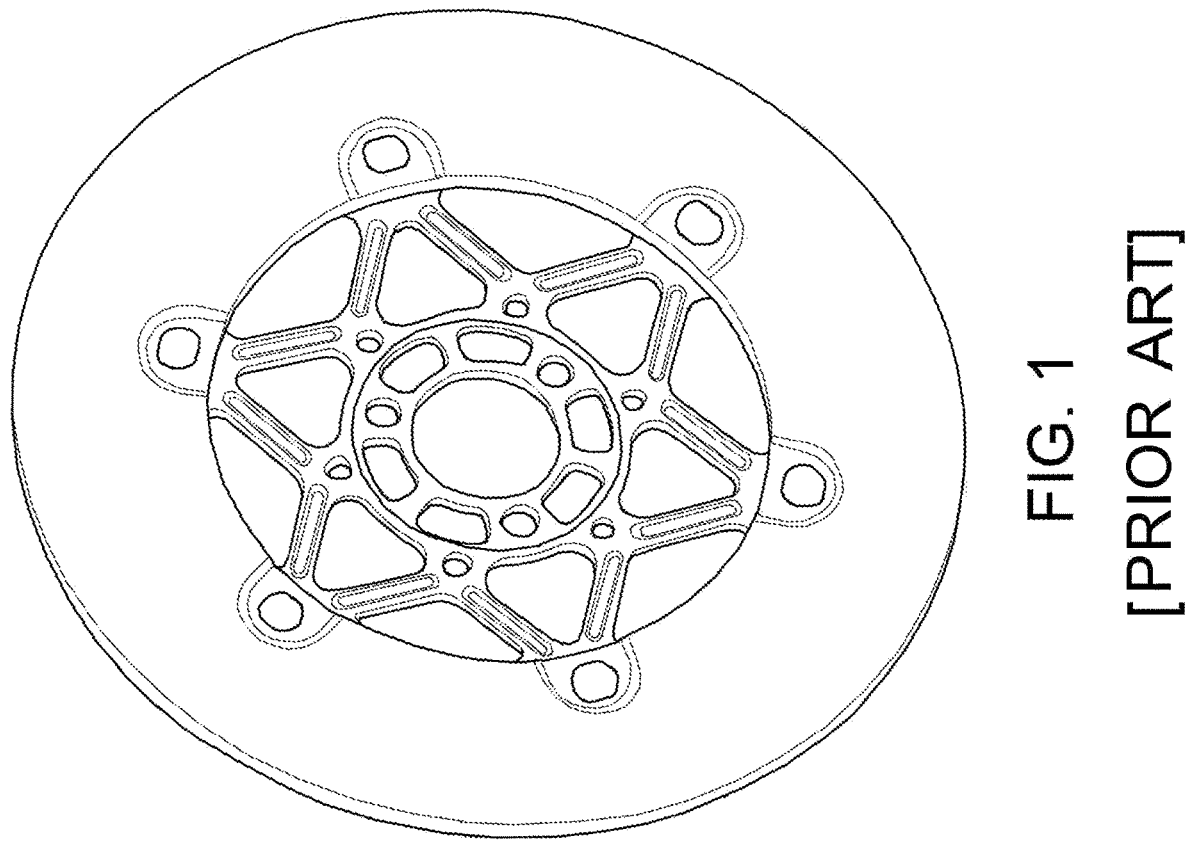
FIG. 1 depicts an axonometric view of a carbon disc for MotoGP use according to the prior art.
Figure 2:
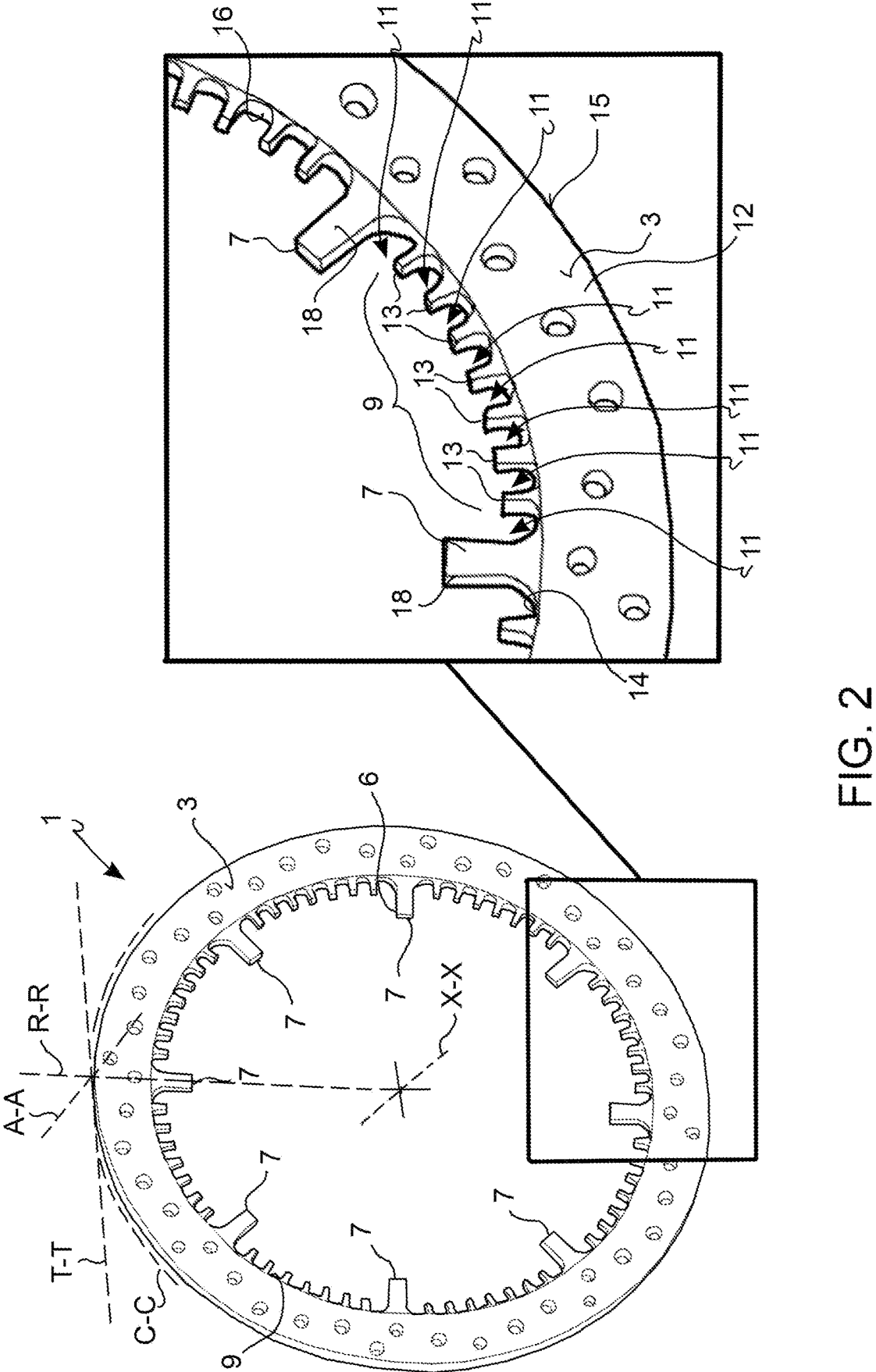
FIG. 2 shows an axonometric view of an in-box enlargement of a braking band for SBK racing application obtained according to the invention.
Figures 3, 4:
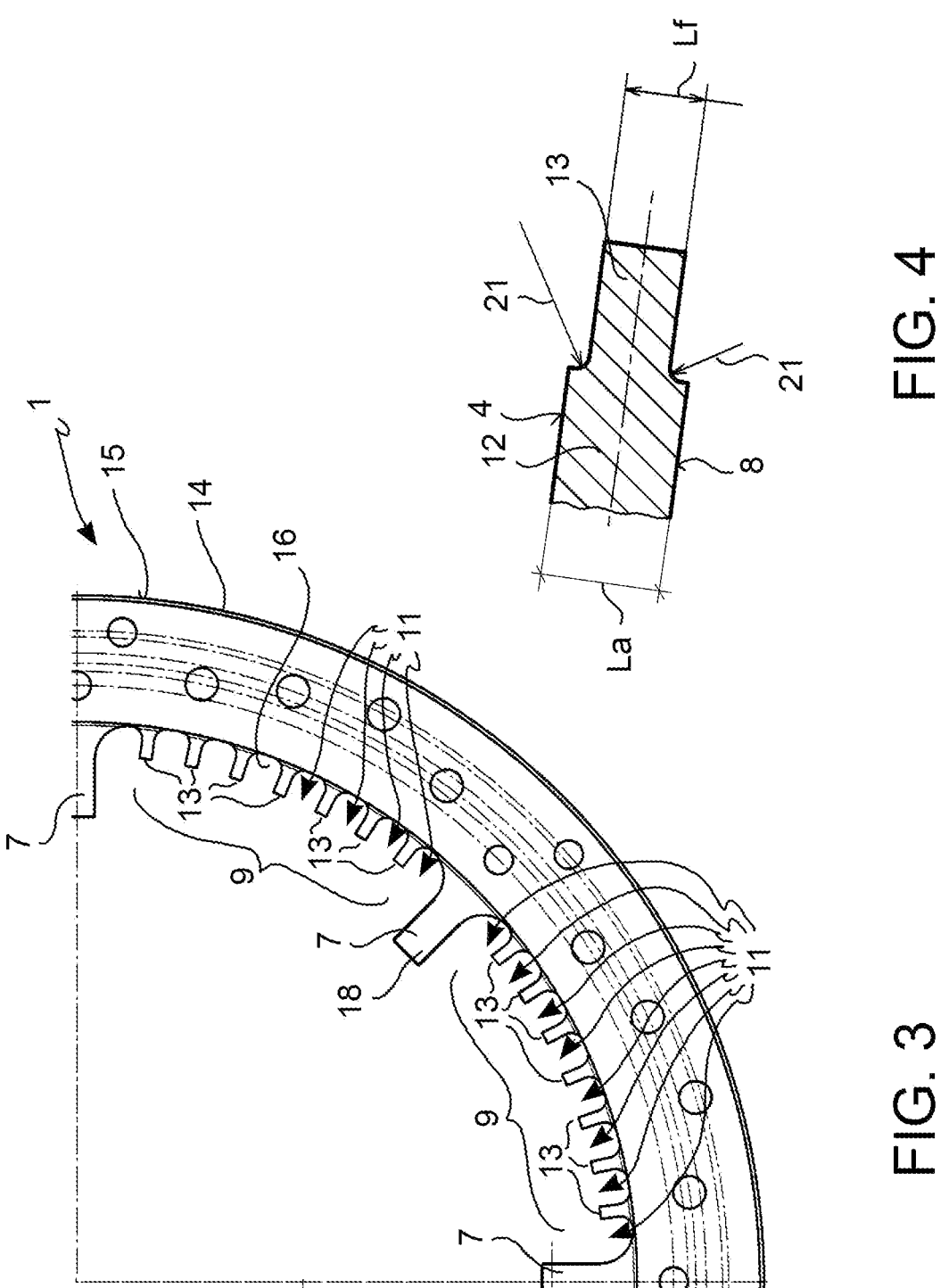
FIG. 3 depicts a front view of a detail of the solution in FIG. 2.
FIG. 4 shows a detail of a cross-section of the band in FIG. 3 where the size of a cooling fin according to the invention is highlighted.
Figure 5:
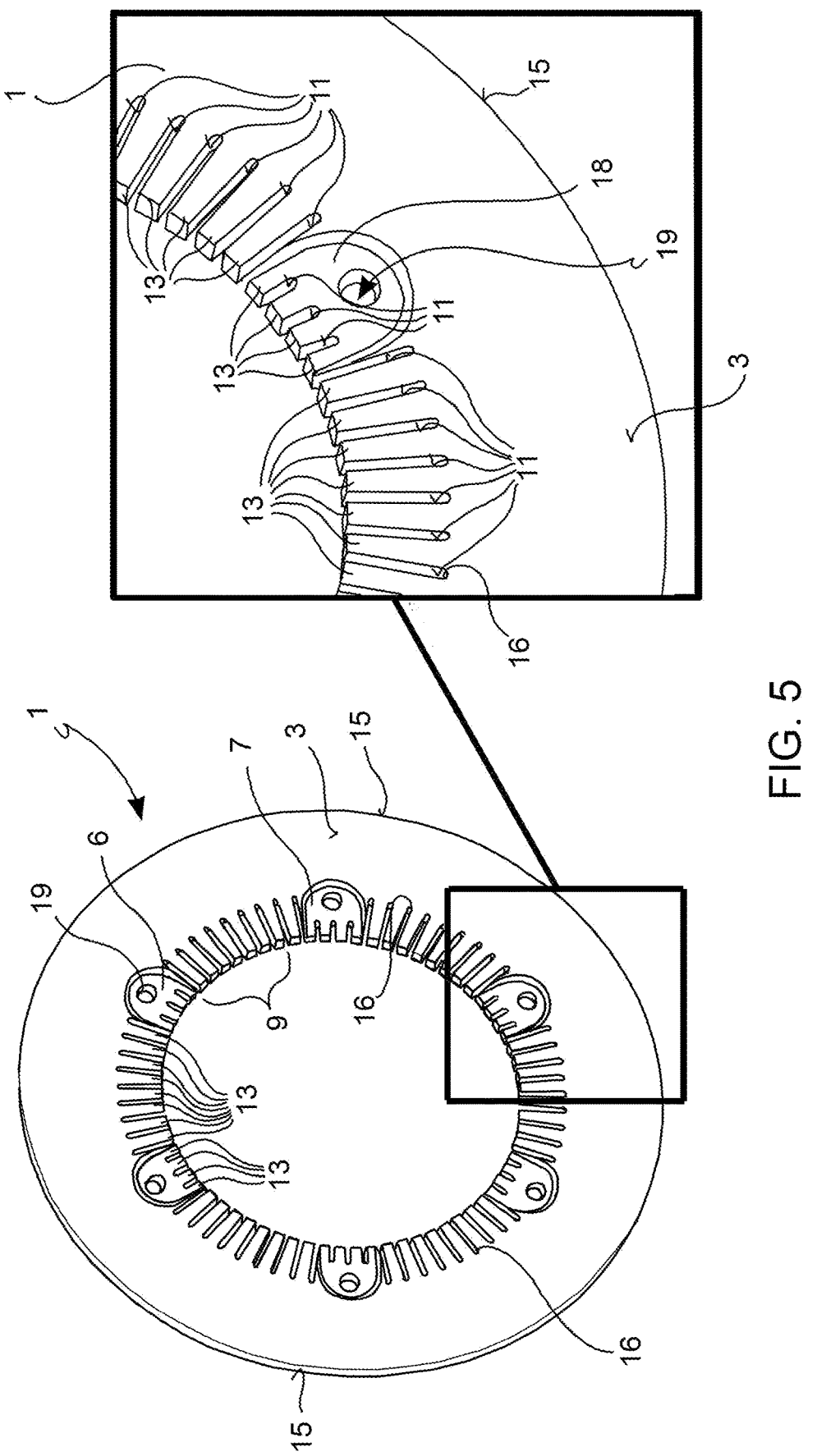
FIG. 5 shows an axonometric view of an in-box enlargement of a braking band for MotoGP racing application obtained according to the invention.
Figure 6:
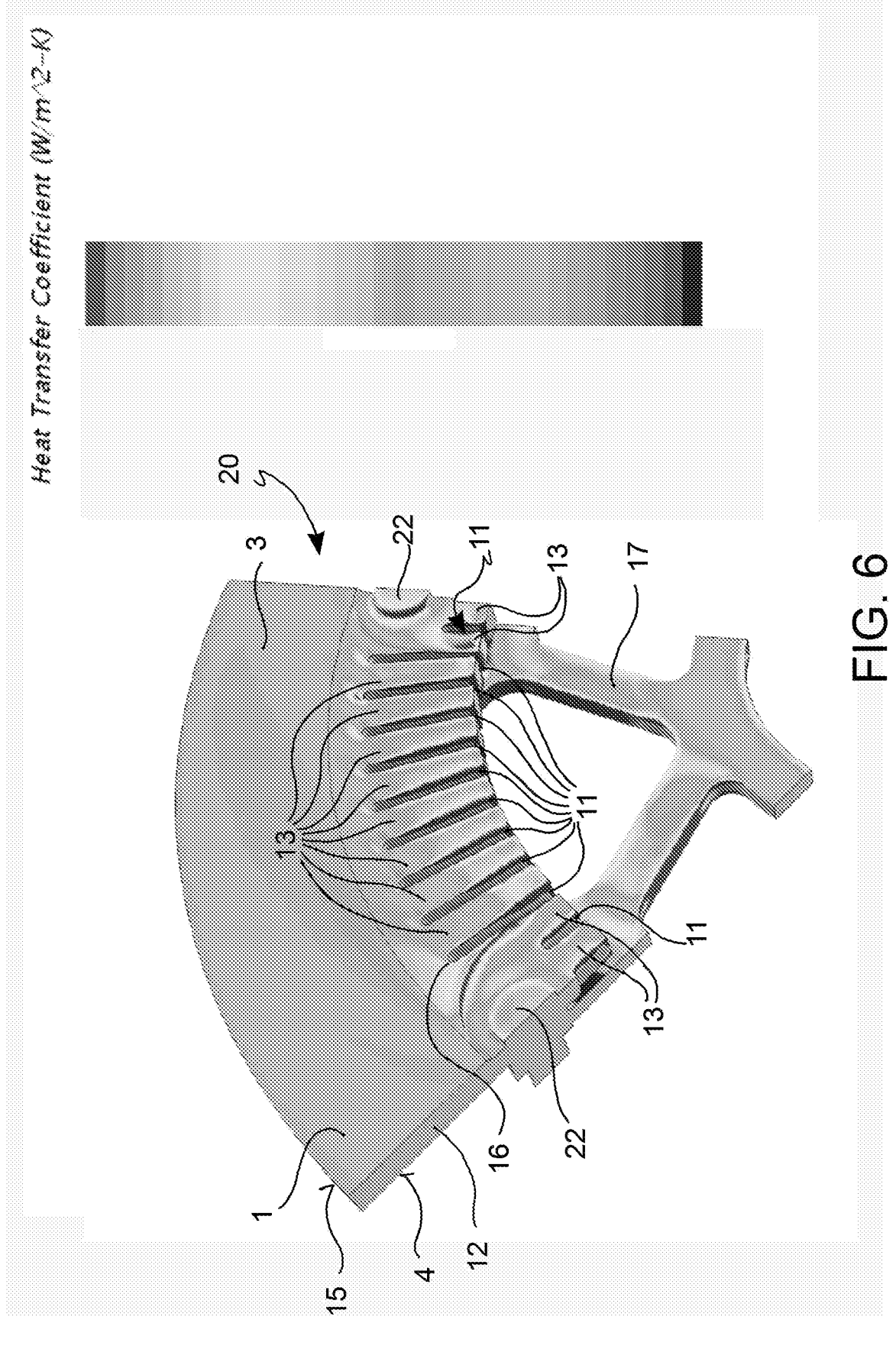
FIG. 6 shows an axonometric view of a circular sector of the braking band in FIG. 5 connected to a braking band supporting element, in which the various values of the heat transfer coefficient are highlighted in shades of gray.
Figures 7, 8:
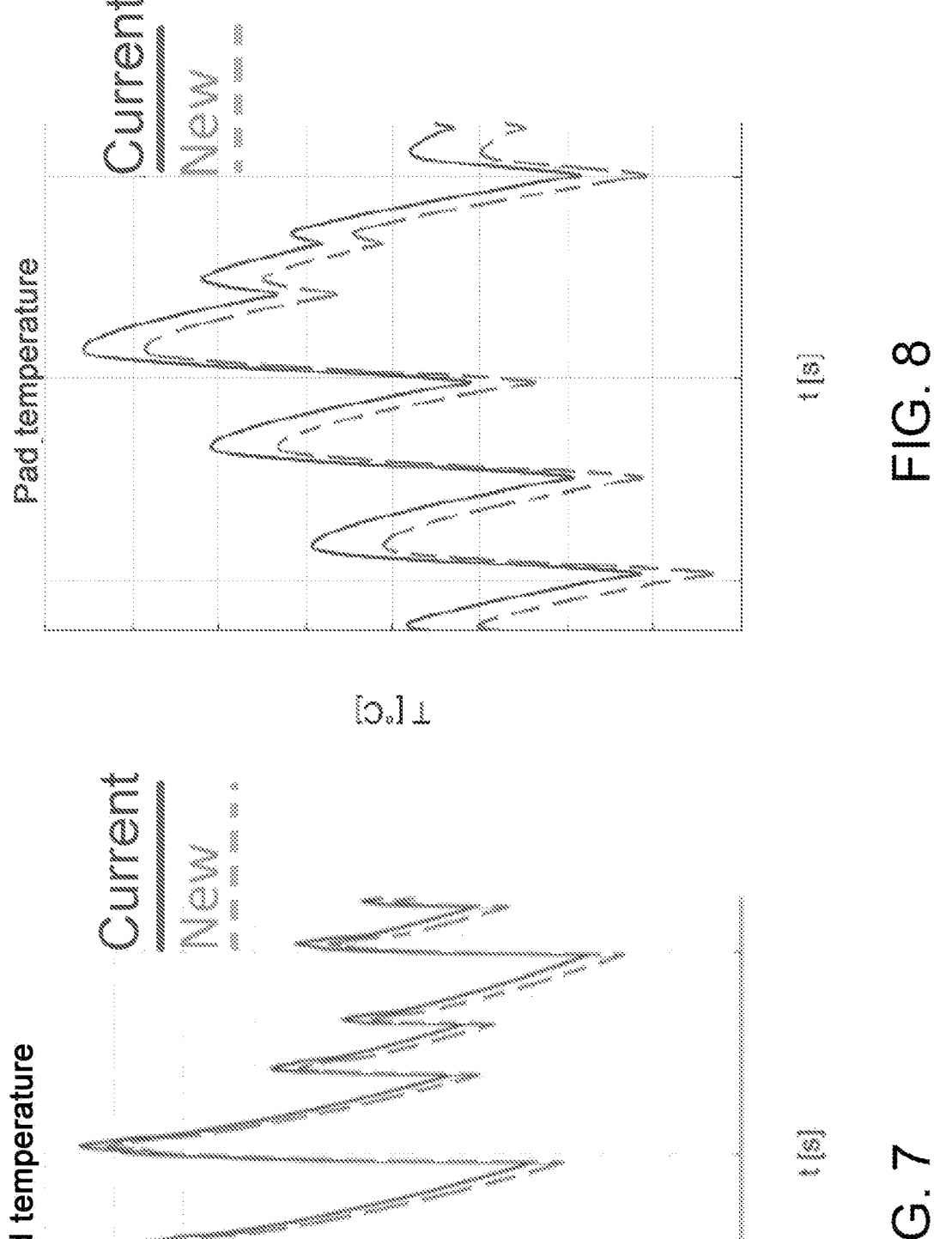
FIG. 7 shows a Cartesian chart of the braking band temperature trend over time in a braking simulation similar to a racing circuit, comparing the known solution shown by a solid line with the solution of the invention shown by a dashed line.
FIG. 8 shows a Cartesian chart of the braking pad temperature trend over time in a braking simulation similar to a racing circuit, comparing the known solution shown by a solid line with the solution of the invention shown by a dashed line.
Figure 9:
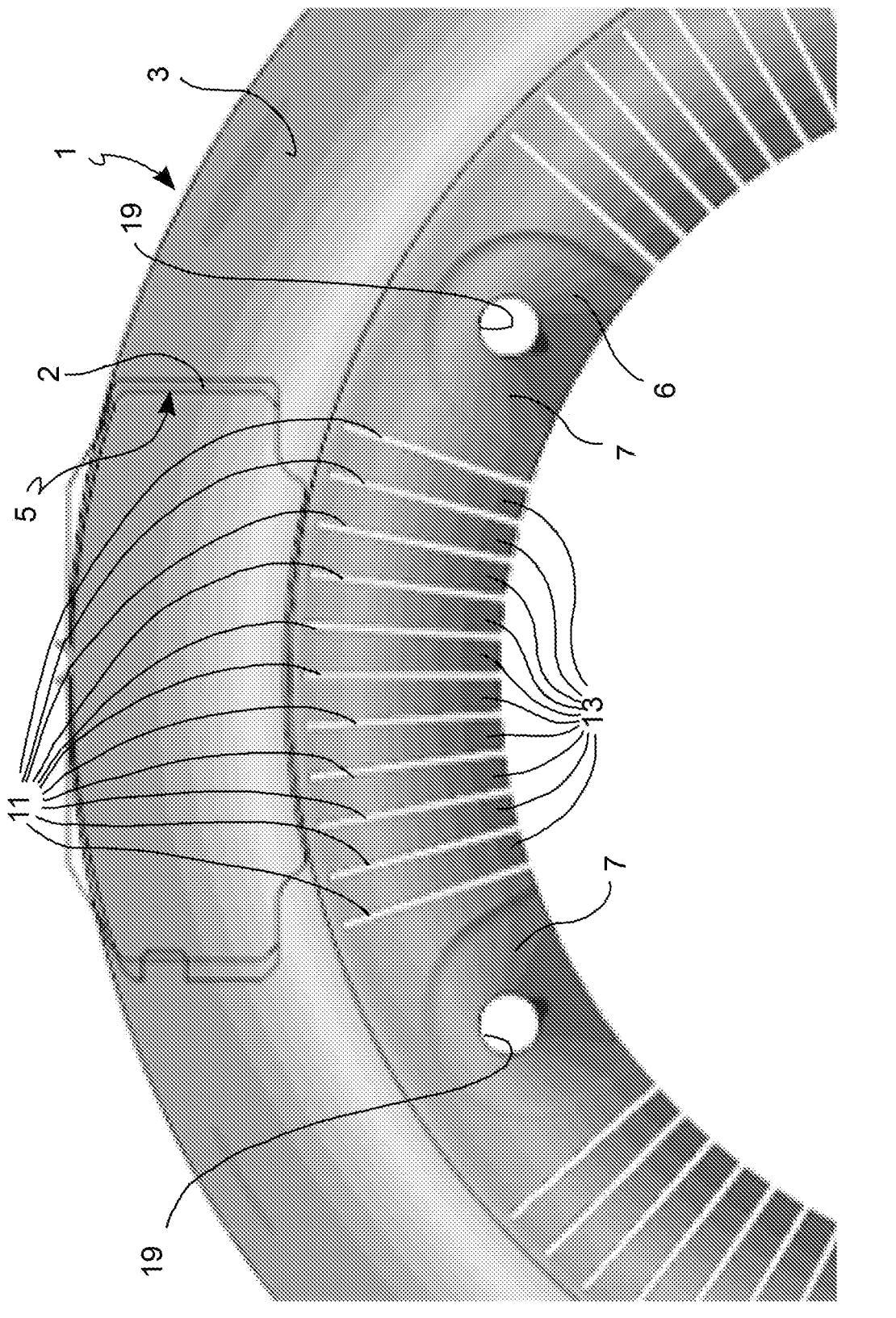
FIG. 9 depicts a front view detail of a braking band according to an embodiment of the invention having a band cooling portion with cooling fins placed radially inside and in which areas at different temperatures are shown with different shades of gray in a braking simulation with a brake pad the resting footprint of which can be seen on the braking surface of the band.
Figure 10:
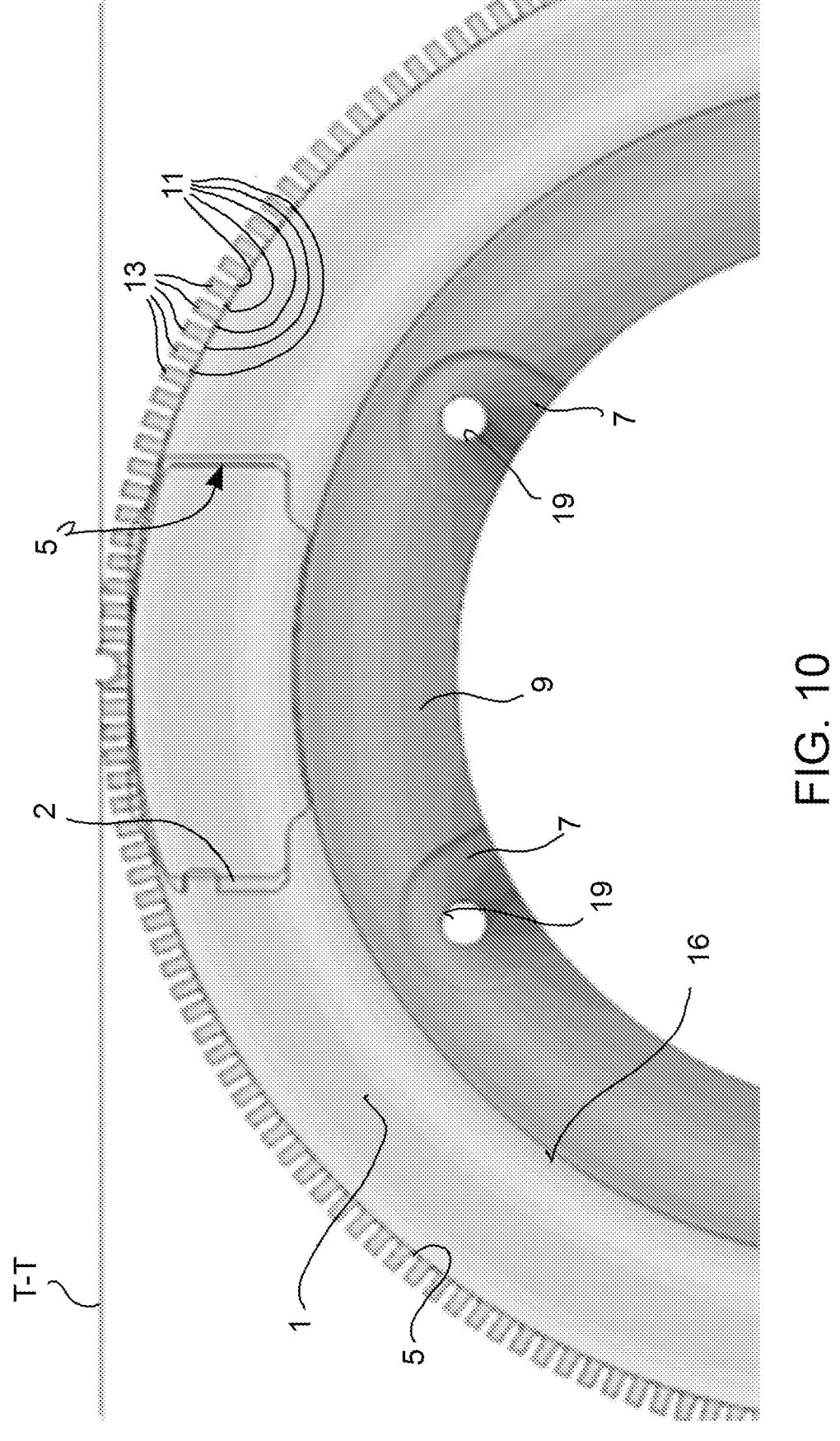
FIG. 10 depicts a front view detail of a braking band according to an embodiment of the invention having a band cooling portion with cooling fins placed radially inside and outside and in which areas at different temperatures are shown with different shades of gray in a braking simulation with a brake pad the resting footprint of which can be seen on the braking surface of the band.
Figure 11:
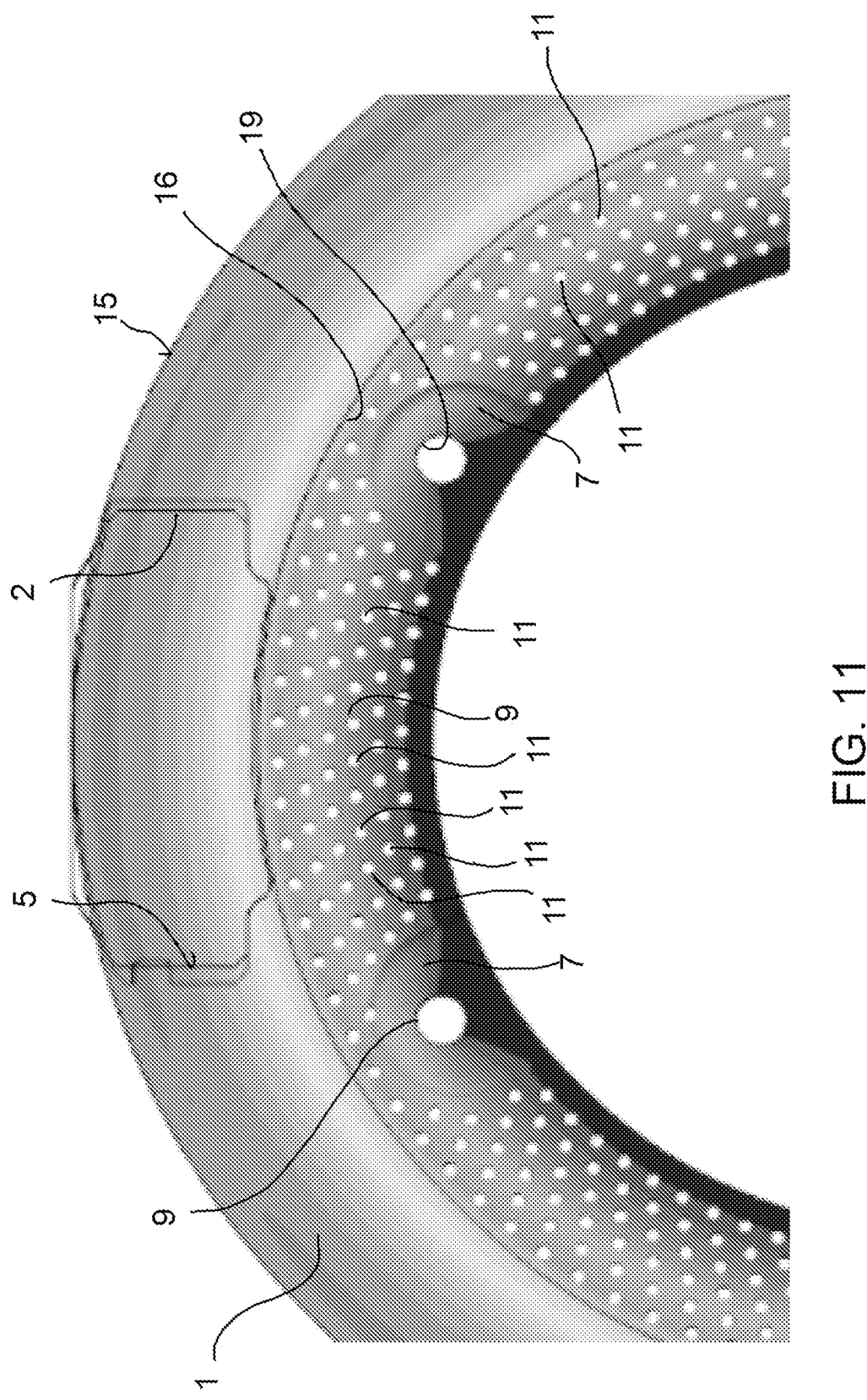
FIG. 11 depicts a front view detail of a braking band according to an embodiment of the invention having a band cooling portion with cooling through-holes placed radially inside and in which areas at different temperatures are shown with different shades of gray in a braking simulation with a brake pad the resting footprint of which can be seen on the braking surface of the band.
Figure 12:
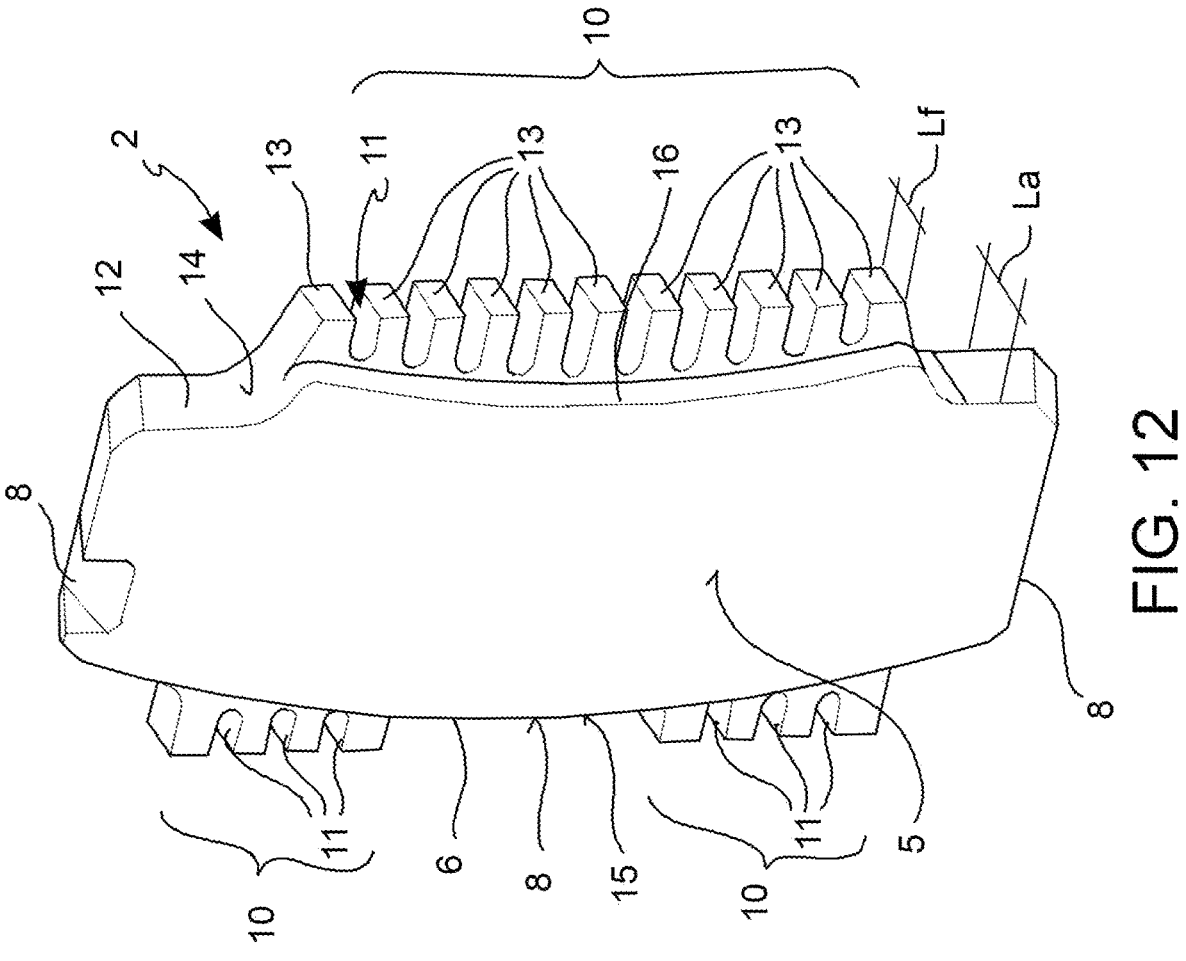
FIG. 12 shows an axonometric view of a brake pad according to the invention.

According to a general embodiment, a braking device 1 or 2 comprises at least one portion thereof having a braking surface 3, 4, or 5 adapted to come into contact with an opposite facing braking surface 5 or 3, 4 to apply a braking action.

Said braking surface 3, 4, or 5 is circumferentially free from obstacles to allow a relative rotation between said braking surface 3, 4, or 5 and opposite facing braking surface 5 or 3, 4 when mutually in contact.

Said braking surface 3, 4, or 5 defines, in any point with respect to a revolution axis X-X thereof, if said braking surface 3, 4 or 5 is a fixed or not rotative surface, or to a rotation axis X-X thereof, if said braking surface 3, 4 or 5 is rotative, an axial direction A-A parallel to said revolution or rotation axis X-X, a radial direction R-R orthogonal to said axial direction A-A and said revolution or rotation axis X-X, a circumferential direction C-C orthogonal to said axial direction A-A and said radial direction R-R and equally spaced apart from said revolution or rotation axis X-X, and punctually a tangential direction orthogonal to said axial direction A-A and said radial direction R-R.

At least one support connecting portion 7 or 8 is included radially outside said braking surface 3,4 or 5, either radially away from or outside of said braking surface 3, 4, or 5, or either radially close to or inside said braking surface 3, 4, or 5.

At least one cooling portion 9 or 10 is included circumferentially and laterally to said support connecting portion 7 or 8.

Said cooling portion 9 or 10 has a plurality of axially through-openings 11 adapted to increase the heat exchange surface and unadapted to create connecting surfaces.

According to an embodiment, said portion having a braking surface 3,4 or 5 has a braking surface body portion 12.

Said braking surface body portion 12 comprises a predetermined maximum axial extension La.

Said cooling portion 9 or 10 extends in a radial direction R-R keeping an extension Lf thereof in the axial direction A-A either equal to or smaller than said predetermined maximum axial extension La of said braking surface body portion 12.

According to an embodiment, said cooling portion 9 or 10 is connected to the braking surface body portion 12 by means of connecting spokes 21.

According to an embodiment, said cooling portion 9 or 10 comprises a plurality of cooling fins 13 separated from one another by said axially through-openings 11.

According to an embodiment, said support connecting portion 7 comprises a plurality of cooling fins 13 separated from one another by said axially through-openings 11.

According to an embodiment, said cooling portion 9 or 10 comprises a plurality of cooling fins 13 separated from one another by said axially through-openings 11.

Each of said cooling fins 13 protrudes in a cantilevered manner from said braking surface body 12.

According to an embodiment, said braking device 1 or 2 comprises a device edge 14 and in particular a radially outer device edge portion 15 arranged closer to said rotation axis or revolution axis X-X and a radially inner device edge portion 16 arranged further away from said rotation axis or revolution axis X-X.

The entire radially outer device edge portion 15, where said support connecting portion 7 or 8 is not present, comprises cooling fins 13 separated from one another by said axially through-openings 11.

According to an embodiment, the entire radially inner device edge portion 16, where said support connecting portion 7 or 8 is not present, comprises cooling fins 13 separated from one another by said axially through-openings 11.

According to an embodiment, said axially through-openings 11 are through-holes.

According to an embodiment, said axially through-openings 11 are through-holes mutually arranged in a quincunx pattern.

According to an embodiment, said axially through-openings 11 are radially extending inlets.

According to an embodiment, said braking device 1 or 2 is in one piece.

According to an embodiment, said braking device 1 or 2 either comprises carbon portions or is entirely made of carbon.

According to an embodiment, said braking device 1 or 2 either comprises carbon-carbon portions or is entirely made of carbon-carbon.

According to an embodiment, said braking device 1 or 2 either comprises portions made of a carbon-ceramic material or is entirely made of a carbon-ceramic material.

According to an embodiment, said braking device 1 or 2 either comprises steel portions or is entirely made of steel.

According to an embodiment, said braking device 1 or 2 either comprises cast-iron portions or is entirely made of cast-iron.

According to an embodiment, said braking device is a braking band 1.

Said braking surface is a pair of opposite braking surfaces 3, 4 of an annular braking band 1.

Said support connecting portion 7 is a connection of the braking band 1 to a bell 17 or directly to a stub axle or wheel rim of a vehicle.

According to an embodiment, said support connecting portion 7 is a connection of the braking band 1 to a bell 17 or directly to a stub axle or wheel rim of a vehicle which comprises connecting protuberances 18 adapted to be coupled geometrically to the seats of a bell 17 or braking band supporting element.

According to an embodiment, said support connecting portion 7 is a connection of the braking band 1 to a bell 17 or directly to a stub axle or wheel rim of a vehicle which comprises connecting protuberances 18 each having a seat 19 for connecting elements 22, e.g., such as bolts or rivets.

According to an embodiment, said cooling portion 9 is an annular-sector-shaped or annular band cooling portion 9.

According to an embodiment, said braking device is a brake disc 20 comprising a braking band 1 connected to a bell or braking band supporting element 17 for connecting the brake disc 20 to a stub axle or wheel of a vehicle.

According to an embodiment, said braking device is a brake pad 2.

Said braking surface 5 is a brake pad braking surface which is free in a circumferential direction C-C to brush a braking surface 3 or 4 of a braking band 1 of a brake disc 20.

Said support connecting portion 8 is a connection of the brake pad 2 to elastic means which bias said brake pad 2 or an abutment surface for supporting or abutting the brake pad 2 against a brake caliper body.

According to an embodiment, said cooling portion 10 is a pad cooling portion placed radially outside the brake pad braking surface 5.

According to an embodiment, said cooling fins 13 protrude in a cantilevered manner in a radial direction from both a radially inner device edge portion 16 and a radially outer device edge portion 15 of said brake pad 2.

LIST OF REFERENCE SYMBOLS

1 braking band
2 brake pad
3 braking band braking surface
4 braking band braking surface
brake pad braking surfaces
6 support connecting portion
7 support connecting portion, i.e. connection of the band to a bell
8 support connecting portion, i.e. connection of the pad to elastic or abutment means against the caliper body
9 band cooling portion
pad cooling portion
11 axially through-openings
12 braking surface portion body
13 cooling fin
14 device edge

15 radially outer device edge portion
16 radially inner device edge portion
17 bell or braking band supporting element
18 connecting protuberances
19 connecting element seats
20 brake disc
21 connecting spokes
22 bell band connecting element, e.g. bolt or rivet
X-X rotation axis or revolution axis of an axial-symmetrical surface
A-A axial direction
R-R radial direction
T-T tangential direction
C-C circumferential direction
La maximum axial extension of braking surface portion body
Lf axial extension of cooling fin

The invention claimed is:

1. A braking device comprising at least one portion thereof comprising a braking surface adapted to come into contact with an opposite facing braking surface to apply a braking action;

said braking surface being circumferentially free from obstacles to allow a relative rotation between said braking surface and opposite facing braking surface when mutually in contact;

said braking surface defining, in any point with respect to a revolution axis (X-X) thereof if said braking surface is fixed, or a rotation axis (X-X) thereof if said braking surface is rotative, an axial direction (A-A) parallel to said revolution or rotation axis (X-X), a radial direction (R-R) orthogonal to said axial direction (A-A) and said revolution or rotation axis (X-X), a circumferential direction (C-C) orthogonal to said axial direction (A-A) and said radial direction (R-R) and equally spaced apart from said revolution or rotation axis (X-X), and a tangential direction orthogonal to said axial direction (A-A) and said radial direction (R-R);

wherein at least one support connecting portion is included radially outside said braking surface, either radially away from or outside said braking surface or either radially close to or inside said braking surface;

and wherein at least one cooling portion is included circumferentially and laterally to said support connecting portion;

and wherein the cooling portion has a plurality of axially through-openings adapted to increase a heat exchange surface and unadapted to create connecting surfaces, said cooling portion comprises a plurality of cooling fins separated from one another by said axially through-openings, and said support connecting portion comprises a plurality of cooling fins separated from one another by said axially through-openings.

2. The braking device of claim 1, wherein
said braking device is a brake pad; and wherein
said braking surface is a brake pad braking surface that is free in the circumferential direction (C-C) to brush a braking surface of a braking band of a brake disc.

3. The braking device of claim 2, wherein said cooling portion is a pad cooling portion radially located outside the brake pad braking surface.

4. The braking device of claim 2, wherein cooling fins protrude in a cantilevered manner in the radial direction from both a radially inner device edge portion and a radially outer device edge portion of said brake pad.

5. The braking device of claim 1, wherein
said portion comprising the braking surface has a braking surface body portion;
said braking surface body portion comprises a predetermined maximum axial extension;
and wherein said cooling portion extends in the radial direction (R-R) keeping an extension thereof in the axial direction (A-A) either equal to or smaller than said predetermined maximum axial extension of said braking surface body portion;
and/or wherein
said cooling portion is connected to the braking surface body portion by connecting spokes.

6. The braking device of claim 5, wherein
said cooling portion comprises a plurality of cooling fins separated from one another by said axially through-openings; and wherein
each of said cooling fins protrudes in a cantilevered manner from said braking surface body portion.

7. The braking device of claim 1, wherein
said braking device is a braking band; and wherein
said braking surface is a pair of opposite braking surfaces of an annular braking band; and wherein
said support connecting portion is a connection of the braking band to a bell or directly to a stub axle or wheel rim of a vehicle; and wherein the braking device comprises at least one of the following features or a combination thereof:
said support connecting portion is a connection of the braking band to a bell or directly to a stub axle or wheel rim of a vehicle comprising connecting protuberances adapted to be coupled geometrically to seats of the bell;
said support connecting portion is a connection of the braking band to a bell or directly to a stub axle or wheel rim of a vehicle comprising connecting protuberances, each connecting protuberance having a seat for connecting elements;
said cooling portion is an annular-sector-shaped or annular band cooling portion.

8. The braking device of claim 7, wherein said braking device is a brake disc comprising a braking band connected to the bell for connecting the brake disc to the stub axle or wheel rim of the vehicle.

9. The braking device of claim 1, wherein
said braking device comprises a device edge and in particular a radially outer device edge portion arranged closer to said revolution or rotation axis (X-X) and a radially inner device edge portion arranged further away from said revolution or rotation axis (X-X); and wherein
the entire radially outer device edge portion, where said support connecting portion is not present, comprises cooling fins separated from one another by said axially through-openings;
and/or
the entire radially inner device edge portion, where said support connecting portion is not present, comprises cooling fins separated from one another by said axially through-openings.

10. The braking device of claim 1, wherein
said axially through-openings are through-holes;
or wherein
said axially through-openings are through-holes arranged in a quincunx pattern;

or said axially through-openings are radially extending
        inlets.

11. The braking device of claim 1, wherein said braking device is in one piece.

12. The braking device of claim 1, wherein said braking device either comprises carbon portions or is entirely made of carbon.

13. The braking device of claim 1, wherein said braking device either comprises carbon-carbon portions or is entirely made of carbon-carbon.

14. The braking device of claim 1, wherein said braking device either comprises portions made of a carbon-ceramic material or is entirely made of a carbon-ceramic material.

15. The braking device of claim 1, wherein said braking device either comprises steel portions or is entirely made of steel.

16. The braking device of claim 1, wherein said braking device either comprises cast iron portions or is entirely made of cast iron.

\* \* \* \* \*